United States Patent [19]

O'Donnell et al.

[11] Patent Number: 5,309,621

[45] Date of Patent: May 10, 1994

[54] METHOD OF MANUFACTURING A WELLBORE TUBULAR MEMBER BY SHRINK FITTING TELESCOPING MEMBERS

[75] Inventors: John A. O'Donnell, Cypress; Richard W. Wilson, The Woodlands, both of Tex.

[73] Assignee: Baker Hughes Incorporated, Houston, Tex.

[21] Appl. No.: 858,100

[22] Filed: Mar. 26, 1992

[51] Int. Cl.$^5$ .............................................. B23P 11/02
[52] U.S. Cl. ...................................... 29/447; 285/381; 29/DIG. 35
[58] Field of Search .................... 29/447, DIG. 35; 285/381; 403/273

[56] References Cited

U.S. PATENT DOCUMENTS

| | | | |
|---|---|---|---|
| 2,636,753 | 4/1953 | Griffin | 29/447 |
| 4,445,265 | 5/1984 | Olson et al. | 29/447 |
| 4,561,683 | 12/1985 | Lumsden et al. | 285/381 |
| 4,616,389 | 10/1986 | Slee | 29/DIG. 35 |

Primary Examiner—Timothy V. Eley
Assistant Examiner—David P. Bryant
Attorney, Agent, or Firm—Felsman, Bradley, Gunter & Dillon

[57] ABSTRACT

A method is provided for securing a wellbore tool assembly to a wellbore tubular member, which includes a number of method steps. The wellbore tubular member is provided, and defines a surface with a substantially cylindrical shape having a selected tubular diameter. A wellbore tool assembly is likewise provided, and includes a plurality of ring-shaped components, with at least one ring-shaped component defining a cylindrical surface having a selected ring diameter which differs from the tubular diameter of the wellbore tubular member. A plurality of radial groove members and radial land members are formed on at least one of the cylindrical surface of the wellbore tubular member and the cylindrical surface of the at least one ring-shaped component of the wellbore tool assembly. The wellbore tubular member and the at least one ring-shaped component of the wellbore tool assembly are urged to differing thermal conditions to cause the tubular diameter and the ring diameter to become substantially equal. While maintaining the differing thermal conditions, the wellbore tubular member and the at least one ring-shaped component of the wellbore tool assembly are coupled together. Then, the wellbore tubular member and the at least one ring-shaped component of the wellbore tool assembly are urged to substantially similar thermal conditions to cause a radial interference coupling therebetween. Preferably, the at least one ring-shaped component operates to retain other wellbore tool assembly components in selected positions relative to the wellbore tubular member.

21 Claims, 7 Drawing Sheets

METHOD OF MANUFACTURING A WELLBORE TUBULAR MEMBER BY SHRINK FITTING TELESCOPING MEMBERS

BACKGROUND OF THE INVENTION

1. Field of the Invention

This invention relates generally to a method of manufacturing wellbore tools and specifically to liner hangers which are used in subterranean wellbores to couple portions of a casing string together.

2. Description of the Prior Art

In the oil and gas industry, a variety of wellbore tools are used which are run into wellbores for temporary or permanent placement in a desired location relative to selected geologic formations, other wellbore tools, or nested wellbore tubulars. The conveyance mechanisms available to run such wellbore tools into wellbores include wirelines, coiled tubing strings, and tubular workstrings. The severe space limitations within wellbores, and wellbore tubular strings such as wellbore casing strings and wellbore production tubing, frequently require that the components of the wellbore tool be carried on the interior or exterior cylindrical surface of a wellbore tubular member. When tubular workstrings are used as a conveyance mechanism, wellbore tools usually include a tubular body which is threaded at its uppermost and lowermost ends for connection in a workstring at a desired location. The components of the wellbore tool are most frequently carried about the cylindrical exterior surface of the tubular body, and are sized to maintain the wellbore tool out of physical contact with wellbore surfaces and nested wellbore tubular strings during a running mode of operation. Wellbore tools such as bridge plugs, packets, and liner hangers are located at a desired position with the wellbore, and then urged from a radially-reduced running condition to a radially-expanded gripping or sealing condition.

To enhance safety and maximize wellbore tool life, it is frequently required that portions of the wellbore tool be secured to the tubular body as permanently as possible. This is especially true for load bearing tools, such as some packers, and all liner hangers. In the case of liner hangers, large axial loads are transferred from the tubular body to a gripping assembly which is carried circumferentially about the exterior surface of the tubular body, and which includes cone rings and gripping slips. The axial load is transferred from the tubular body, through the gripping assembly, to a nested wellbore tubular.

To enhance safety and ensure wellbore tool integrity and longevity, two general manufacturing options exist: forming all, or portions, of the wellbore tool directly into the tubular body by machining; or welding all, or portions, of the wellbore tool to the exterior or interior surface of the tubular body. Machining requires the use of expensive and complex metal working equipment, thus restricting manufacturing and assembly operations to dedicated manufacturing sites with access to a work force which includes highly skilled machinists. Machining also adds considerably to the expense of manufacturing operations. The use of welding to secure selected wellbore tool components to the exterior or interior surfaces of a tubular body has similar disadvantages. Manufacturing and assembly operations are generally restricted to selected manufacturing facilities which have access to highly skilled welders. Welding components to a tubular body can weaken the structural strength of the tubular body, and jeopardize the performance and longevity of a wellbore tool. Therefore, welding operations ordinarily require careful inspection to ensure that the tool contains no defective welds.

In the oil and gas industry, manufacturing operations are highly centralized, with several cities and locations being the source of a large number of wellbore tools used all around the globe at remote locations. Typically, wellbore tools are manufactured entirely at one location, and are shipped in final and completed form to a well site for immediate use. It is not uncommon for wellbore tools to be ordered for immediate delivery and use; therefore, manufacturers are, as a practical matter, required to have inventory of assembled tools on hand for immediate shipment to remote locations. Of course, having valuable corporate capital tied up in manufactured and assembled equipment runs contrary to the principles of just-in-time manufacturing which dictate that only minimal amounts of corporate capital be tied up in inventory.

The fact that many wellbore tools are manufactured entirely at a selected small number of locations, and shipped to remote locations around the globe, means that, for many wellbore tools, shipping expenses comprise a considerable portion of the total cost to the end user. Therefore, decentralized manufacturing and assembly would probably result in both lower prices for end users, and lower costs for manufacturers, but would require that complicated machining and welding operations be performed at a great number of locations around the globe. For the reasons set forth above, decentralized machining or welding operations are impractical, since they require capital-intensive equipment and highly skilled workers.

SUMMARY OF THE INVENTION

It is one objective of the present invention to provide a method of manufacturing a wellbore tool which allows a wellbore tool assembly to be secured to the exterior or interior surface of a wellbore tubular member, without requiring welding of any of the components of the wellbore tool assembly to the exterior or interior surface of the wellbore tool member.

It is another objective of the present invention to provide a manufacturing method for use with wellbore tools which allows for the use of a conventional cylindrically-shaped tubular member as a central body, with slight or no modification, upon which the components of the wellbore tool assembly may be secured.

It is yet another objective of the present invention to provide a method of manufacturing wellbore tools which minimizes shipping costs by simplifying assembly to allow a wellbore tool assembly to be shipped to a remote location for placement on a substantially conventional wellbore tubular member which is disposed at the remote location.

It is yet another objective of the present invention to provide a method of manufacturing for use with wellbore tools which allows substantially risk-free decentralization of manufacturing and assembly operations by minimizing the need for expensive and highly skilled labor.

These objectives are achieved as is now described. A method is provided for securing a wellbore tool assembly to a wellbore tubular member, which includes a number of method steps. The wellbore tubular member is provided, and defines a surface with a substantially cylindrical shape having a selected tubular diameter. A wellbore tool assembly is likewise provided, and includes a plurality of ring-shaped components, with at least one ring-shaped component defining a cylindrical surface having a selected ring diameter which differs from the tubular diameter of the wellbore tubular member. A plurality of radial groove members and radial land members are formed on at least one of the cylindrical surface of the wellbore tubular member and the cylindrical surface of the at least one ring-shaped component of the wellbore tool assembly. The wellbore tubular member and the at least one ring-shaped component of the wellbore tool assembly are urged to differing thermal conditions to cause the tubular diameter and the ring diameter to become substantially equal. While maintaining the differing thermal conditions, the wellbore tubular member and the at least one ring-shaped component of the wellbore tool assembly are coupled together. Then, the wellbore tubular member and the at least one ring-shaped component of the wellbore tool assembly are urged to substantially similar thermal conditions to cause a radial interference coupling therebetween. Preferably, the at least one ring-shaped component operates to retain other wellbore tool assembly components in selected positions relative to the wellbore tubular member.

More specifically, in the preferred embodiment of the present invention, the method of manufacturing requires that upper and lower groove-and-land regions be formed on the exterior surface of the tubular member, and that they be spaced apart a selected distance along the exterior surface. A plurality of radial groove and radial land members are also formed on the interior surfaces of upper and lower ring-shaped components of the wellbore tool assembly. Selected ones of the radial land members on the upper and lower ring-shaped components are undersized with respect to corresponding groove members on the exterior surface of the wellbore tubular member. Thermal energy is applied to the upper and lower ring-shaped components of the wellbore tool assembly to cause thermal expansion of the upper and lower ring-shaped components to a dimension larger than the tubular diameter of the wellbore tubular member. While maintaining the upper and lower ring-shaped components in an expanded condition, the upper and lower ring-shaped components are placed upon the upper and lower groove-and-land regions of the exterior surface of the wellbore tubular member. Next, the upper and lower ring-shaped components of the wellbore tool assembly are cooled to cause shrinkage and return to the ring diameter. This creates an interference coupling between the wellbore tubular member and the upper and lower ring-shaped components of the wellbore tool assembly. Thereafter, the wellbore tubular member and the upper and lower ring-shaped components of the wellbore tool assembly are maintained at substantially similar thermal conditions to maintain the interference coupling.

In the preferred embodiment, the wellbore tool assembly is retained in a substantially fixed position upon the exterior surface of the wellbore tubular member between the upper and lower ring-shaped components, without requiring weldment between any of the components of the wellbore tool assembly and the exterior surface of the wellbore tubular member. Also, in the preferred embodiment of the present invention, an interference coupling is provided between selected ones of the radial groove and land members of the upper and lower ring-shaped components and the upper and lower groove-and-land regions of the wellbore tubular member. Finally, in the preferred embodiment of the present invention, at least a portion of an axial load which is supplied to the wellbore tubular member is transferred through at least one of the upper and lower ring-shaped components to a nested tubular.

It is another objective of the present invention to provide an improved liner hanger apparatus in which no components of the liner hanger assembly are secured to the tubular body of the liner hanger apparatus by weldments.

It is still another, more specific, objective of the present invention to provide an improved liner hanger apparatus in which one or more cone rings are secured to the exterior surface of the tubular body of the liner hanger apparatus by means of an interference fitting, which serves as a reliable, low-cost alternative to welding of the cone rings and other components to the tubular body of the liner hanger apparatus.

It is yet another, more specific, objective of the present invention to provide an improved liner hanger apparatus which is composed of a tubular body which defines a generally cylindrical outer surface, and a gripping assembly which is disposed circumferentially about at least a portion of the generally cylindrical outer surface of the tubular body, wherein the gripping assembly includes at least one ring-shaped component which is secured to the tubular body by at least one groove-and-land coupling between a plurality of radial groove members and radial land members disposed on an interior surface of the ring-shaped component and a plurality of groove members and land members disposed on a portion of the generally cylindrical outer surface of the tubular body, with a plurality of the land members oversized with respect to a plurality of the groove members to provide a permanent, interference coupling.

It is still another objective of the present invention to provide an improved liner hanger apparatus kit, for assembly with a wellbore tubular disposed at a remote location, wherein the kit includes at least one cone ring member having a tapered exterior surface and a generally cylindrical interior surface with a plurality of threads formed thereon of preselected crest and root dimensions, a gripping assembly which is concentrically disposable about a portion of the threaded wellbore tubular, and a retainer ring having a generally cylindrical interior surface with a plurality of threads formed thereon of preselected crest and root dimensions, wherein the crest and root dimensions of the cone rings and retainer ring allow the cone rings and retainer ring to be placed upon the wellbore tubular when in a first thermal condition relative to the wellbore tubular, but which provide an interference fit with the wellbore tubular when maintained at a thermal condition substantially similar to that of the wellbore tubular.

It is yet another objective of the present invention to provide a method of manufacturing liner hangers in which selected components of the liner hanger assembly are provided with threads on interior surfaces with root and crest dimensions, some of which are dissimilar to those of threads on the exterior surface of the tubular body of the liner hanger apparatus, wherein such components are thermally expanded immediately before placement on the tubular body of the liner hanger, and which cool to provide an interference fit at the threaded coupling.

These and other objectives are achieved as is now described. When viewed as a liner hanger apparatus, the present invention includes a number of components which cooperate. A tubular body is provided, which defines a generally cylindrical outer surface. A gripping assembly is disposed circumferentially about at least a portion of the generally cylindrical outer surface of the tubular body. The gripping assembly is operable in a plurality of modes including a radially-reduced running mode of operation and a radially-enlarged gripping mode of operation. In switching between the running and gripping modes of operation, the tubular body is axially displaced relative to at least a portion of the gripping assembly. The gripping assembly includes at least one ring-shaped component which is secured to the tubular body by at least one groove-and-land coupling between a plurality of groove members and land members disposed on an interior surface of the at least one ring-shaped component and a plurality of groove members and land members disposed on a portion of the generally cylindrical outer surface of the tubular body. The groove-and-land coupling includes a plurality of land members which are oversized with respect to a plurality of groove members to provide a permanent coupling.

During assembly, the threaded components of the liner hanger assembly are maintained at a thermal condition which differs from that of the tubular body of the liner hanger apparatus, allowing thermal expansion or contraction of the materials to temporarily alter the dimensions of the root and crest portions of the threaded coupling, allowing those components to be placed into position upon the tubular body of the liner hanger apparatus; thereafter, when the liner hanger assembly and tubular body of the liner hanger apparatus obtain substantially similar thermal conditions, the root and crest portions of the threaded coupling provide an interference fit.

The liner hanger apparatus of the present invention may also be considered as an apparatus kit, which allows assembly of the liner hanger assembly onto a threaded wellbore tubular which is maintained at a remote location. The wellbore tubular has a generally cylindrical exterior surface, and includes upper and lower threads of preselected crest and root dimensions. The kit includes at least one cone ring member having a tapered exterior surface, and a generally cylindrical interior surface with a plurality of threads formed thereon of preselected crest and root dimensions. The kit further includes a gripping slip assembly which is concentrically disposable about at least a portion of threaded wellbore tubular. Finally, the kit includes a retainer ring having a generally cylindrical interior surface with a plurality of threads formed thereon of preselected crest and root dimensions. The gripping slip assembly is maintained in a fixed position relative to the threaded wellbore tubular between an upper cone ring member and the retainer ring. The upper cone ring member and the retainer ring are coupled to the wellbore tubular while being maintained at a selected thermal condition which differs from that of the wellbore tubular, and which allows assembly. Thereafter, the upper cone ring member and the retainer ring obtain a thermal condition comparable to that of the wellbore tubular, and provide a permanent interference fit at the threaded coupling.

Additional objectives, features and advantages will be apparent in the written description which follows.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
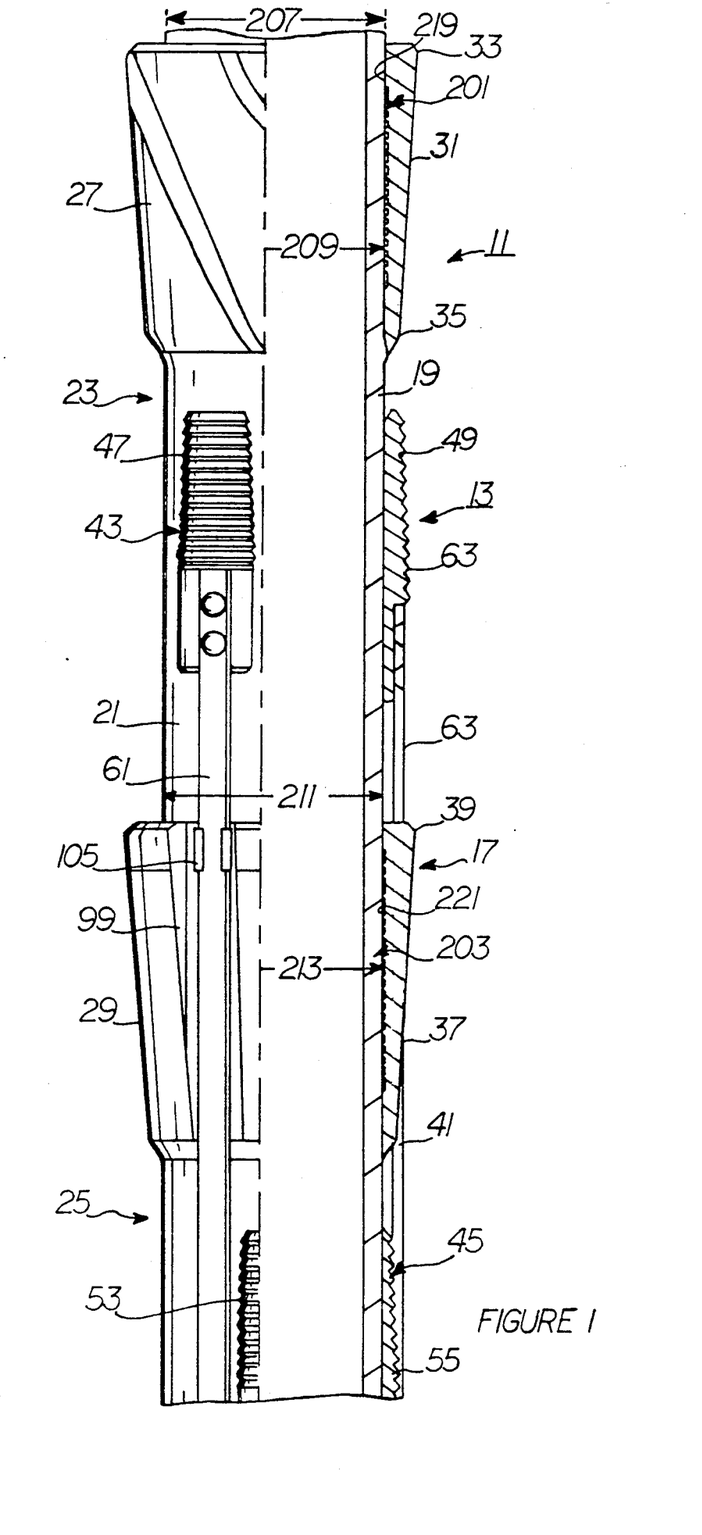
FIG. 1 is a one-quarter longitudinal section view of an upper portion of the improved liner hanger apparatus of the present invention in a running mode of operation.
Figure 2:
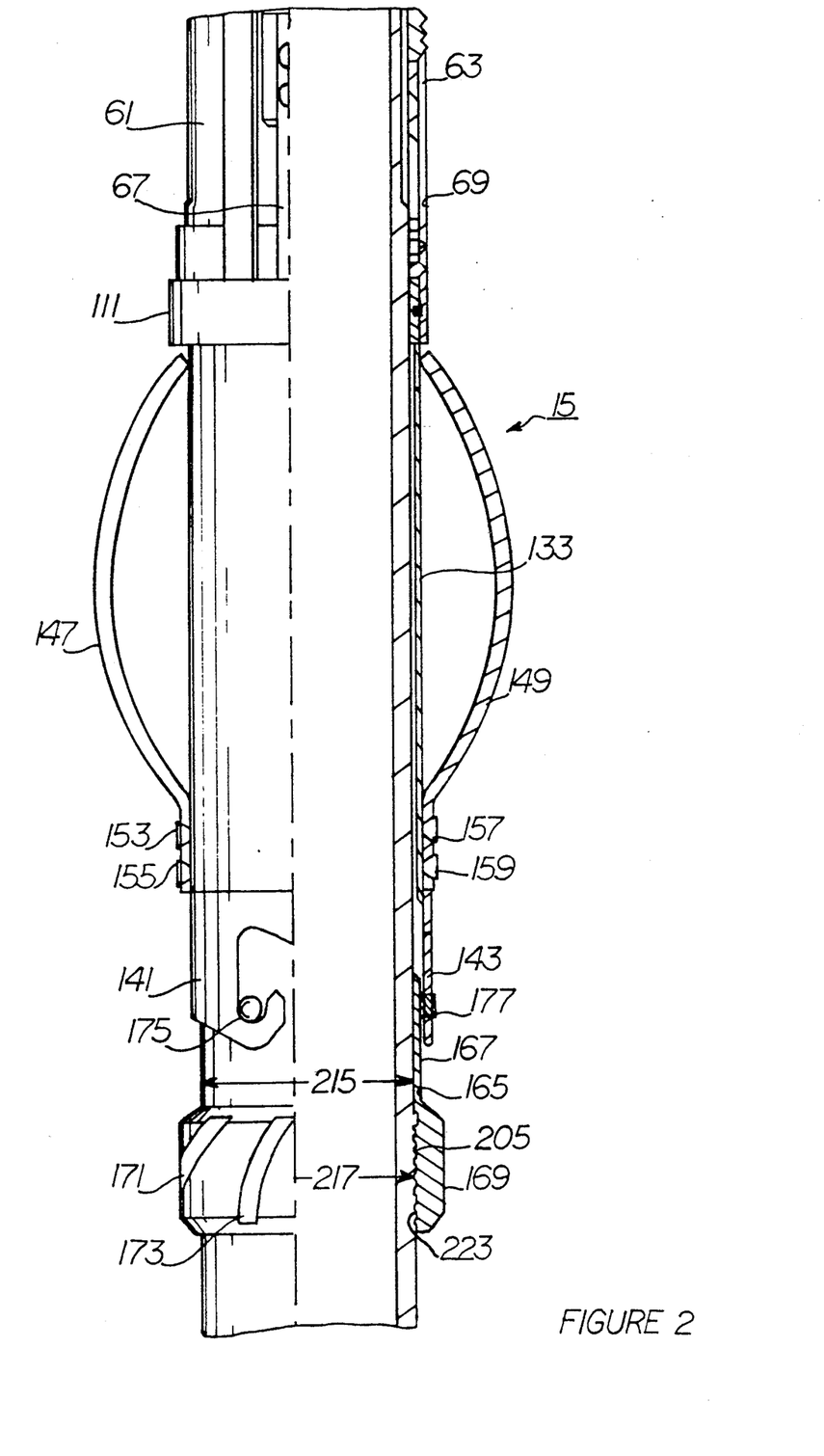
FIG. 2 is a one-quarter longitudinal section view of a lower portion of the improved liner hanger apparatus of the present invention, in a running mode of operation, and should be read in combination with FIG. 1.

FIGS. 1 and 2 are one-quarter longitudinal section views of the upper and lower portions 13, 15, respectively, of the improved liner hanger apparatus 11 of the present invention in a configuration suited for a running mode of operation. The improved liner hanger apparatus 11 includes gripping assembly 17 which includes a number of components which are disposed circumferentially about cylindrical-shaped exterior surface 21 of tubular member 19. Preferably, tubular member 19 comprises a wellbore tubular member which is threaded at its uppermost and lowermost ends (not shown in the figures) for selective coupling of the improved liner hanger apparatus 11 in a string of wellbore tubular members which are positionable in a wellbore. Improved liner hanger apparatus 11 is used in a conventional manner to couple together portions of a wellbore casing which are dissimilar in radial dimension.

The components which comprise gripping assembly 17 are spaced apart along a selected axial length of tubular member 19. In the preferred embodiment of the present invention, gripping assembly 17 includes a plurality of ring-shaped components, with at least one of the ring-shaped components secured to exterior surface 21 of tubular member 19 by an interference coupling. With reference first to FIG. 1, the components of gripping assembly 17 include upper cone and slip subassembly 23 and lower cone and slip subassembly 25. Upper cone ring 27 includes inclined outer surface 31 which is substantially uniformly sloped from upper radially-enlarged portion 33 to lower radially-reduced portion 35, and is generally triangular in cross-section view. Lower cone ring 29 is disposed downward from upper cone ring 27, and includes inclined outer surface 37 which is also substantially uniformly sloped from upper radially-enlarged portion 39 to lower radially-reduced portion 41, and is also generally triangular in cross-section view.

Upper gripping slip array 43 is disposed along exterior surface 21 of tubular member 19 beneath upper cone ring 27. Lower gripping slip array 45 is disposed along exterior surface 21 of tubular member 19 beneath lower cone ring 29. Upper gripping slip array 43 includes three gripping slips 47, 49, 51 (gripping slip 51 is obscured in FIG. 1) which are radially spaced approximately one hundred and twenty degrees apart along exterior surface 21 of tubular member 19. Likewise, lower gripping slip array 45 includes three gripping slips 53, 55, 57 (gripping slip 57 is obscured in FIG. 1) which are disposed about exterior surface 21 of tubular member 19, and spaced apart approximately one hundred and twenty degrees. Gripping slips 47, 49, 51 of upper gripping slip array 43 are held in their radial positions respectively by guide rails 61, 63, 65 (guide rail 65 is obscured in the view of FIG. 1; it serves to hold gripping slip 51 which is also obscured in the view of FIG. 1). Likewise, guide rails 67, 69, 71 operate to hold gripping slips 53, 55, 57 in their respective radial positions (guide rail 71 is not shown in the view of FIG. 1; it serves to hold gripping slip 57 which is also not shown in the view of FIG. 1).

Figure 3:
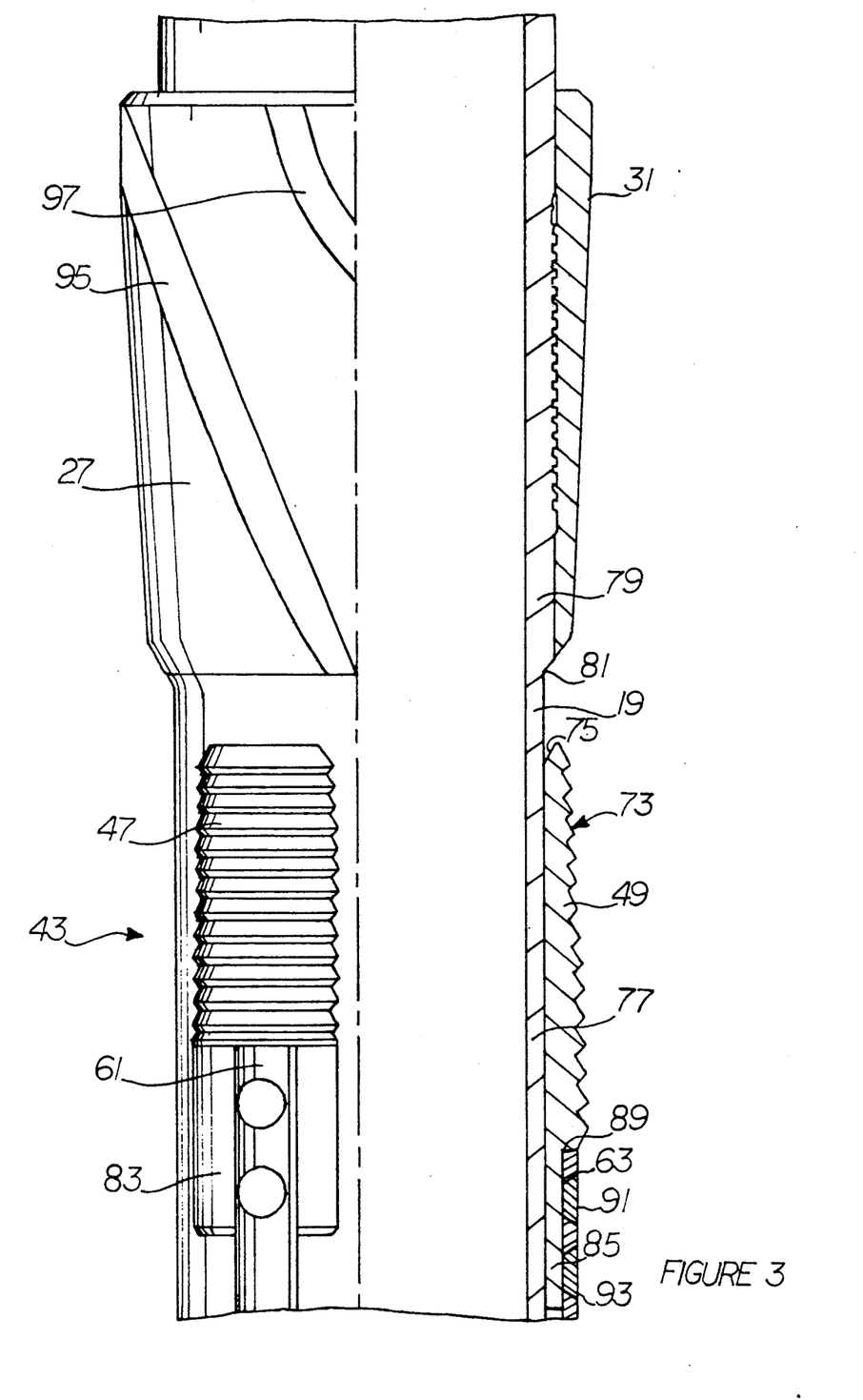
FIG. 3 is a one-quarter longitudinal section view of the improved liner hanger apparatus of the present invention of FIGS. 1 and 2, but which show greater detail of the improved liner hanger apparatus of the present invention.

With reference now to FIG. 3, the functional relationship between upper cone ring 27 and upper gripping slip array 43 will now be used as an example to describe more particularly the structure and function of the gripping slips and the cone rings. As is shown in the longitudinal section of gripping slip 49, each of gripping slips 47, 49, 51 includes a plurality of arcuate gripping teeth 73 which are oriented outward and downward from the body of gripping slip. In a gripping mode of operation, the plurality of arcuate gripping teeth 73 will serve to engage an interior cylindrical surface of a wellbore tubular which is disposed radially outward from upper gripping slip array 43.

In switching between the radially-reduced running mode of operation and the radially-enlarged gripping mode of operation, tubular member 19 and upper cone ring 27 are moved axially downward relative to upper gripping slip array 43, causing gripping slips 47, 49, 51 to ride up over inclined outer surface 31 of upper cone ring 27 and be urged radially outward. Each of gripping slips 47, 49, 51 is equipped with an angled leading edge, such as angled leading edge 75 of gripping slip 49. In the preferred embodiment, the exterior surface of tubular member 19 includes radially reduced portion 77 and radially enlarged portion 79, with inclined transition portion 81 extending therebetween. Preferably, inclined transition portion 81 is disposed at an angle similar to that of angled leading edge 75, to allow gripping slip 49 to move easily radially outward as tubular member 19 and upper cone ring 27 are urged axially downward. Each of gripping slips 47, 49, 51 are equipped with radially-reduced stem portions 83, 85, 87 (radially reduced stem portion 87 is obscured in the view of FIGS. 1 and 3, and is disposed on the lowermost end of gripping slip 51 which is also obscured in the views of FIGS. 1 and 3). Radially reduced stem portions 83, 85, 87 are adapted for engagement with the uppermost end of guide rails 61, 63, 65 respectively. As is shown in the longitudinal section view of FIG. 3, gripping slip 49 (and the other gripping slips) include guide rail shoulder 89 which abut the uppermost end of guide rail 63. For each of gripping slips 87, 89, 91, guide rails 61, 63, 65 are secured by welds 91, 93, or other suitable connectors. The other gripping slips of upper gripping slip array 43 have a structure identical to that of gripping slip 49.

As is shown in FIG. 3, upper cone ring 27 includes arcuate flow channels 95, 97, which extend between the lowermost and uppermost ends of upper cone ring 27. Arcuate flow channels 95, 97 are provided to allow wellbore fluids to pass upward through the improved liner hanger apparatus 11 of the present invention during cementing operations, since cement which is pumped downward will displace wellbore fluids. Arcuate flow channels 95, 97 are oriented at an angle of approximately forty-five degrees from parallel with the central longitudinal axis of the improved liner hanger apparatus 11 of the present invention to minimize the possibility of having the angled leading edges (such as angled leading edge 75) of gripping slips 47, 49, 51 from becoming caught or otherwise engaged in the flow channel.

With reference once again to FIGS. 1 and 2, as is shown, lower cone ring 29 does not include arcuate flow channels, but instead includes axial guide tracks 99, 101, and 103 (axial guide tracks 101, 103 are obscured in the view of FIG. 1. Axial guide tracks 99, 101, 103 are radially disposed approximately one hundred and twenty degrees apart from one another, and are adapted in width for receiving guide rails 61, 63 and 65 respectively, each of which is respectively secured to gripping slips 47, 49, 51. Each of axial guide tracks 99, 101, 103, are equipped with a rail latch 105, 107, 109, respectively (rail latches 107, 109 are obscured in the view of FIG. 1) which serves two functions. First, rail latches 105, 107, 109 keep guide rails 61, 63, 65 close to tubular member 19 during the running mode of operation to minimize the possibility of having guide rails 61, 63, 65 from accidentally contracting or becoming attached to other objects or surfaces in the wellbore. Second, rail latches 105, 107, 109 limit the extent to which guide rails 61, 63, 65 may be urged radially outward as gripping slips 47, 49, 51 expand outward during sliding engagement with inclined outer surface 31 of upper cone ring 27.

As is shown in FIGS. 1 and 2, gripping slips 53, 55, 57 are secured at their lowermost end to guide rails 67, 69, 71 (gripping slip 57 and the guide rail 71 are obscured in the views of FIGS. 1 and 2). Each of guide rails 61, 63, 65, 67, 69, 71 terminate at their lowermost end at guide rail retainer ring 111, which serves to maintain guide rails 61, 63, 65, 67, 69, 71 in a fixed radial position relative to tubular member 19.

Figure 4:
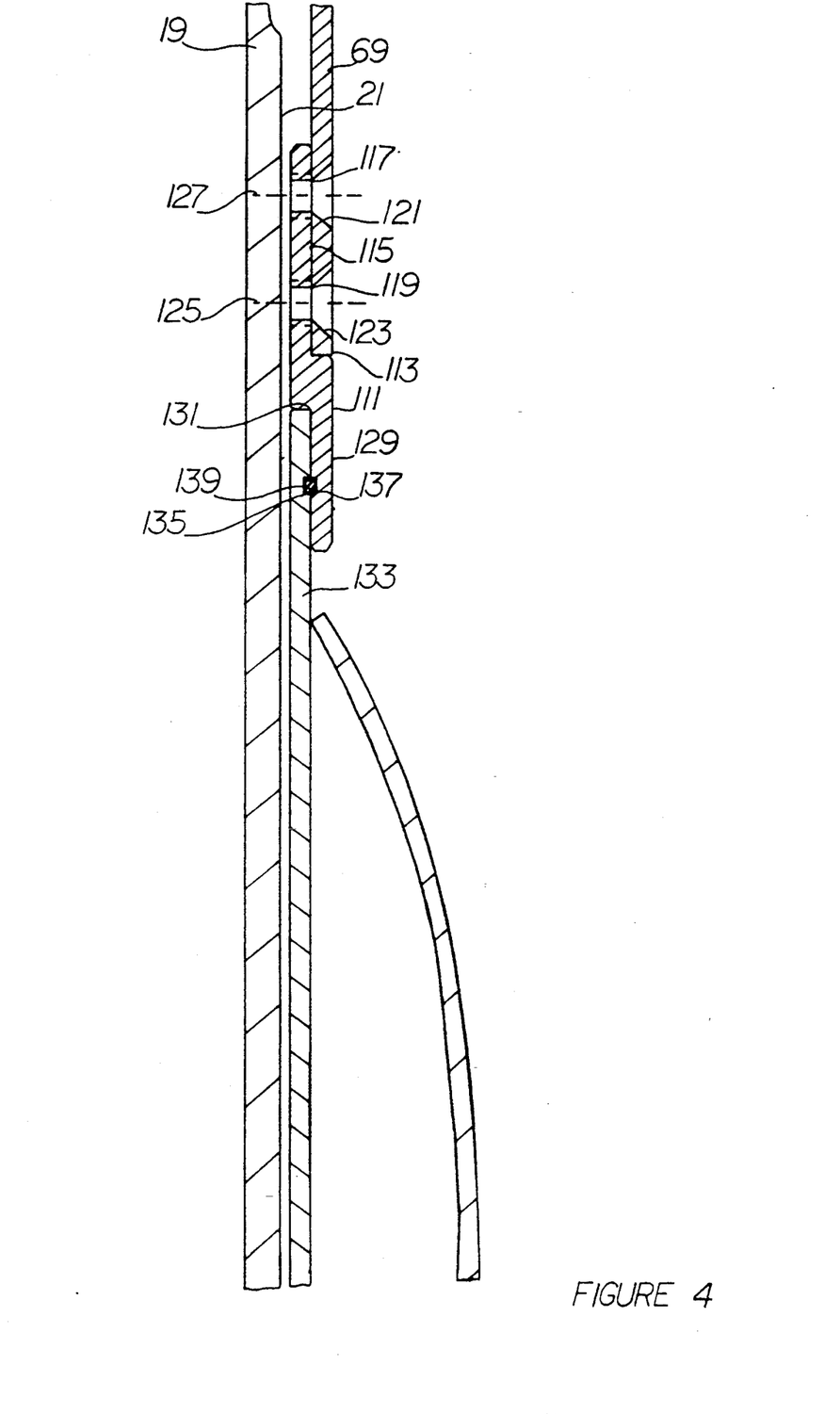
FIG. 4 is a fragmentary one-quarter longitudinal section view of the guide rail retainer ring of the improved liner hanger of the present invention.

FIG. 4 is a fragmentary one-quarter longitudinal section view of a portion of the improved liner hanger apparatus 11 of the present invention which includes guide rail retainer ring 111. As is shown in this figure, the guide rails, such as guide rail 69, terminate at their lowermost end and are in abutting relationship with external shoulder 113 of guide rail retainer ring 111, and engage the external surface of radially-reduced portion 115 of guide rail retainer ring 111. Threaded ports, such as threaded ports 117, 119 extend through radially-reduced portion 115 of guide rail retainer ring 111, and may be aligned with fastener ports 121, 123 at the lowermost extent of guide rail 69. Threaded set screws 125, 127 (which are depicted only graphically) may be provided for coupling guide rail 69 to radially-reduced portion 115 of guide rail retainer ring 111, and setting against exterior surface 21 of tubular member 19.

At its lowermost end, guide rail retainer ring 111 includes radially-enlarged portion 129 which in-part defines internal shoulder 131 which is adapted for abutment with the uppermost end of connector sleeve 133. Preferably, radially-enlarged portion 129 defines a gage ring which protects the other components of gripping assembly 17 from damage and from becoming accidentally and detrimentally coupled to other objects in the wellbore. External snap ring cavity 135 which is disposed on the exterior surface of connector sleeve 133 is alignable with internal snap ring cavity 137 on the internal surface of the lowermost portion of guide rail retainer ring 111. Snap ring 139 is disposed at least in-part in external snap ring cavity 135 and at least in-part in internal snap ring cavity 137, and serves to hold guide rail retainer ring 111 and connector sleeve 133 together.

Figure 5:
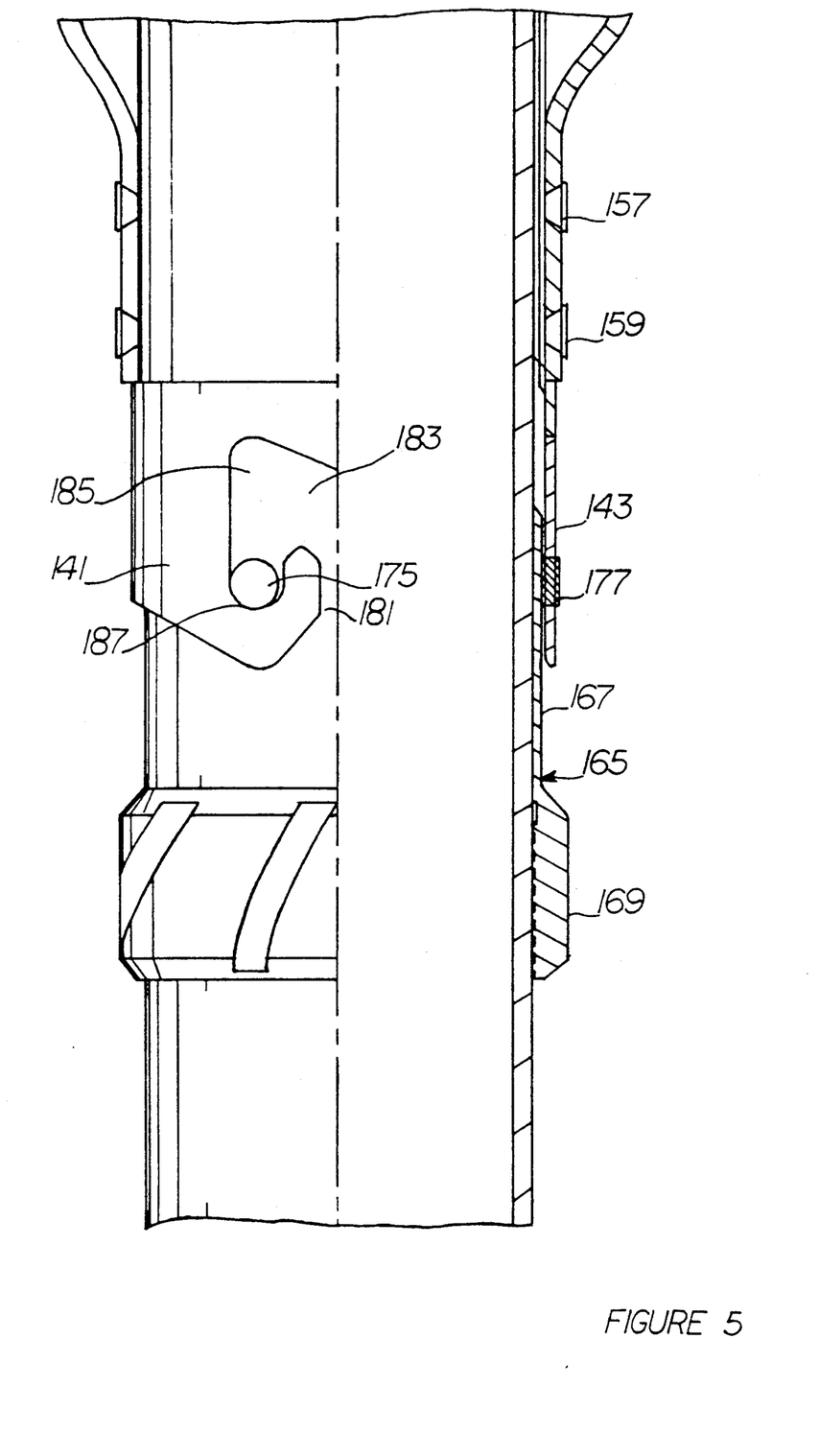
FIG. 5 is a one-quarter longitudinal section view of the lowermost portion of the improved liner hanger apparatus of the present invention of FIG. 2.

With reference again to FIG. 2, connector sleeve 133 extends downward along exterior surface 21 of tubular member 19, and couples to j-hooks 141, 143, 145 (j-hook 145 is not depicted in FIG. 2). Preferably, j-hooks 141, 143, 145 are radially disposed one hundred and twenty degrees apart along the exterior surface 21 of tubular member 19. A plurality of drag springs 147, 149, 151 are coupled at their lowermost end to connector sleeve 133 by connectors 153, 155, 157, 159, 161, 163, (connectors 161 and 163 are not shown in FIG. 2, and serve to couple drag spring 151 which is also not shown in FIG. 2). Preferably, drag springs 147, 149, 151 are disposed one hundred and twenty degrees apart around exterior surface 21 of tubular member 19. In the preferred embodiment of the present invention, j-hooks 141, 143, 145 are disposed over the upper end of radially-reduced portion 167 of retainer sleeve 165. Retainer sleeve 165 is enlarged at its lowermost end defining a radially-enlarged portion 169. A plurality of arcuate flow paths, including arcuate flow paths 171, 173, are disposed on the external surface of the radially-enlarged portion 169 of retainer sleeve 165. Pegs 175, 177, 179 (peg 179 is obscured in FIG. 2) are secured to radially-reduced portion 167 of retainer sleeve 165 and extend radially outward therefrom. As is shown in FIG. 5, pegs 175, 177 are adapted for releasable engagement with j-hooks 141, 143. Each of the j-hooks 141, 143, 145 include the following components which are depicted in FIG. 5 in connection with j-hook 141. Opening 181 is provided to allow release of peg 175 from j-hook 141. Rotation path 183 is provided to allow relative rotational movement of j-hook 141 and peg 175. Axial path 185 is provided to allow axial displacement of peg 175 relative to j-hook 141. Peg-cradle 187 is provided at the lowermost portion of j-hook 141, and is adapted for receiving peg 175 during a running mode of operation.

Figure 7:
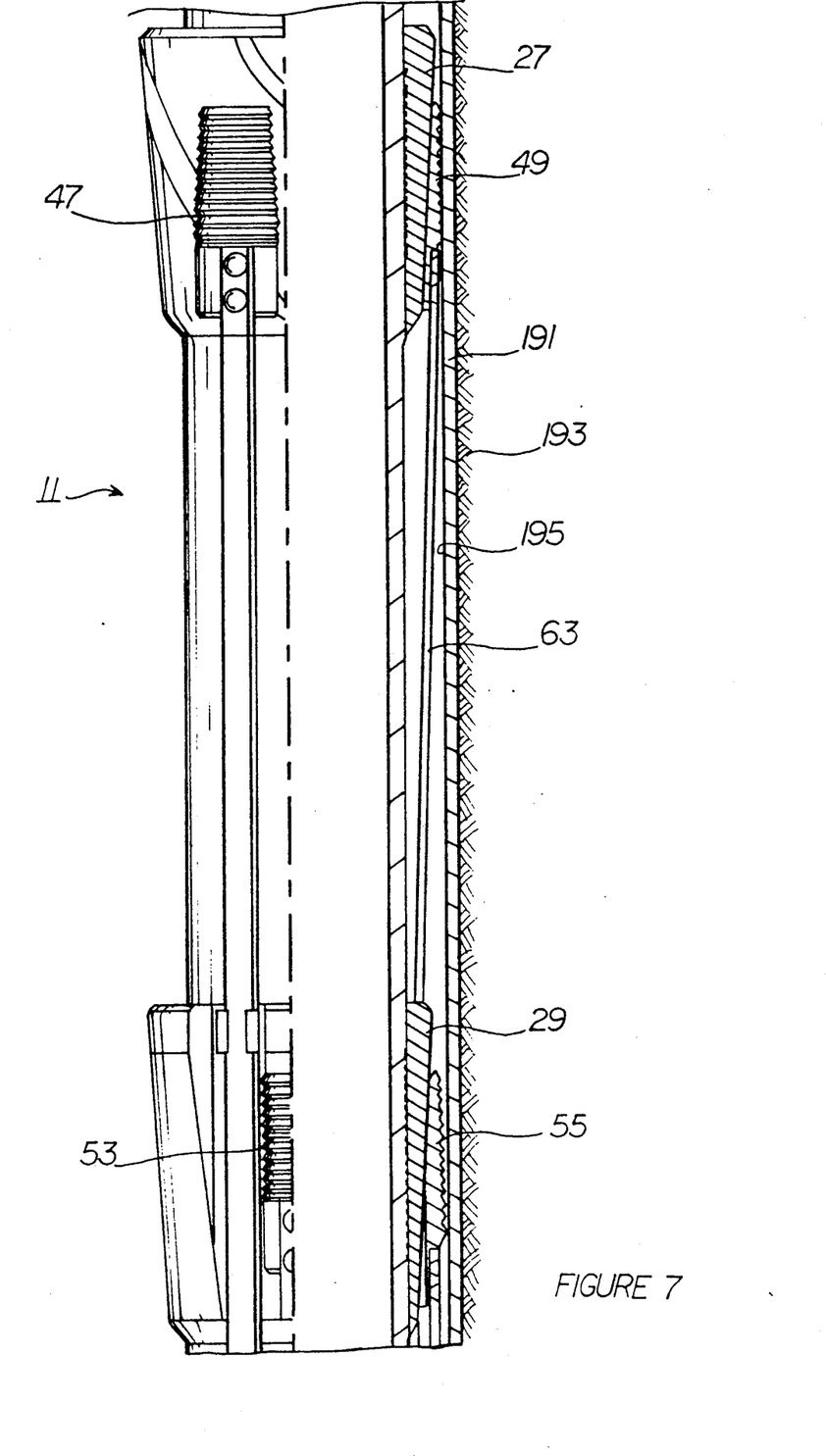
FIG. 7 is a one-quarter longitudinal section view of an upper portion of the preferred embodiment of the improved liner hanger apparatus of the present invention in a gripping mode of operation.

In moving between the radially-reduced running mode of operation and the radially-expanded gripping mode of operation, the string of tubular members which includes tubular member 19 is pulled upwardly from the surface, causing drag springs 147, 149, 151 to frictionally engage an interior cylindrical surface of a tubular member which is disposed radially outward from the improved liner hanger apparatus 11 of the present invention (this surface is shown only in FIG. 7). As a consequence, the components of gripping assembly 17 which are secured to tubular member 19 will be moved upwardly relative to components of gripping assembly 17 which are not secured to exterior surface 21 of tubular member 19. More specifically, upper and lower cone rings 27, 29 and retainer sleeve 165 will move axially upward relative to drag springs 147, 149, 151, and guide rail retainer ring 111 and associated guide rails and gripping slips. Consequently, pegs 175, 177, 179 will move upward relative to j-hooks 141, 143, 145 along paths like axial path 185 of j-hook 141.

Next, the tubing string which includes tubular member 19 is rotated. Once again, drag springs 147, 149, 151 will prevent movement of j-hooks 141, 143, 145, this time to allow pegs 175, 177, 179 to decouple from j-hooks 141, 143, 145. Thus, drag springs 147, 149, 151, guide rail retainer ring 111, guide rails 61, 63, 65, 67, 69 and 71, as well as gripping slips 47, 49, 51, 53, 55, and 57, will become disconnected from tubular member 19.

Next, the operator applies a set down weight to the tubing string which includes tubular member 19. Drag springs 147, 149, 151 will prevent or resist movement of gripping slips 47, 49, 51, 53, 55, and 57 (and associated guide rails and guide rail retainer ring) allowing upper and lower cone rings 27, 29 to be displaced axially downward relative to gripping slips 47, 49, 51, 53, 55, and 57, causing the gripping slips to ride upon inclined outer surfaces 31, 37 of upper and lower cone rings 27, 29.

FIG. 7 is a one-quarter longitudinal section view of an upper portion of the preferred embodiment of the improved liner hanger apparatus 11 of the present invention in a gripping mode of operation. As is shown in the figures, gripping slips 47, 49 are disposed about a midregion of upper cone ring 27, and in tight gripping engagement with wellbore tubular 191 which is disposed within wellbore 193. Preferably, wellbore tubular 191 comprises a wellbore tubular which is connected in a string of wellbore tubulars which together comprise a portion of a casing string. Liner hanger apparatus 11 of the present invention serves to grippingly engage interior wellbore surface 195 and suspend another, smaller-diameter, casing string to the lowermost end of the string which includes wellbore tubular 191. As is shown in FIG. 7, gripping slips 53, 55 extend over a midregion of lower cone ring 29, and also grippingly engage interior wellbore surface 195 of wellbore tubular 191.

A portion of the axial load which is applied to the wellbore string which includes tubular member 19 is transferred through upper and lower cone rings 27, 29, and gripping slips 47, 49, 51, 53, 55, and 57 to wellbore tubular 191. Therefore, the coupling between upper and lower cone rings 27, 29 must be strong enough to withstand such axial loads. In prior art liner hanger devices, cone rings of the gripping assembly are either machined into a piece of steel, or are secured to the exterior surface of a wellbore tubular member by welding. As discussed above, in the description of the prior art, there are substantial costs and risks associated with machining and welding wellbore tool components, such as the upper and lower cone rings of a liner hanger apparatus. If the cone ring is to be machined into a piece of steel, there is substantial material costs associated with the blank cylinder which is to be machined. In addition, there is substantial wastage of material in forming high-profile wellbore tool components, such as the upper and lower cone rings of the liner hanger apparatus. Welding cone rings to the exterior surface of a wellbore tubular member can be substantially less expensive than machining the cone rings, but welding can weaken the material from which the tubular member is formed. Additionally, welding of wellbore tool components, such as cone rings, to the exterior surface of a wellbore tubular member requires highly skilled welders, and equally highly skilled quality and assurance personnel to inspect the welds to determine that they are strong enough and suitable for use in a wellbore under expected loading conditions.

With reference again to FIGS. 1 and 2, in the present invention, a number of components which comprise gripping assembly 17 are secured to exterior surface 21 of tubular member 19 by an interference coupling. More specifically, upper cone ring 27, lower cone ring 29, and retainer sleeve 165 are secured to exterior surface 21 of tubular member 19 by interference couplings therebetween. As shown in FIGS. 1 and 2, the portion of tubular member 19 which carries upper cone ring 27 defines a substantially cylindrical exterior surface which defines outer diameter 207. Upper cone ring 27 includes a substantially cylindrical interior surface 219 which defines inner diameter 209. The region of exterior surface 21 of tubular member 19 upon which lower cone ring 29 is disposed defines a substantially cylindrical exterior surface with a selected outer diameter 211. Lower cone ring 29 includes substantially cylindrical interior surface 221 which defines a selected inner diameter 213. The portion of exterior surface 21 of tubular member 19 which carries retainer sleeve 165 defines a substantially cylindrical exterior surface. Retainer sleeve 165 includes a substantially cylindrical interior surface 223. In the preferred embodiment of the present invention, selected inner diameter 209 of upper cone ring 27 is smaller than outer diameter 207 of that portion of tubular member 19. Likewise, selected inner diameter 213 of lower cone ring 29 is smaller than outer diameter 211 of that portion of exterior surface 21 of tubular member 19. Finally, inner diameter 217 of retainer sleeve 165 is smaller than the outer diameter 215 of that portion of exterior surface 21 of tubular member 19.

In the present invention, wellbore tool components, such as the wellbore tool components of gripping assembly 17, which include internal generally cylindrical surfaces are to be secured to other tool components, such as tubular member 19, in a manner which is to be as strong a coupling (or stronger) as can be obtained by welding these components together. In the preferred embodiment of the present invention, at least one of the generally cylindrical mating surfaces includes a plurality of radial groove members and radial land members with selected ones of the radial groove and land members adapted for placement in the desired location when the wellbore tool components are maintained at differing thermal conditions. When the wellbore tool components are maintained at substantially similar thermal conditions, selected ones of the radial groove and land members are adapted for providing an interference fit coupling with the adjoining surface of a tool component. In the preferred embodiment described herein, liner hanger apparatus 11 includes a plurality of ring-shaped components which have interior generally thermal condition which differs from that of tubular member 19, but which provide an interference fit coupling when the ring-shaped component and the tubular member 21 are maintained at substantially similar thermal conditions.

Figure 6:
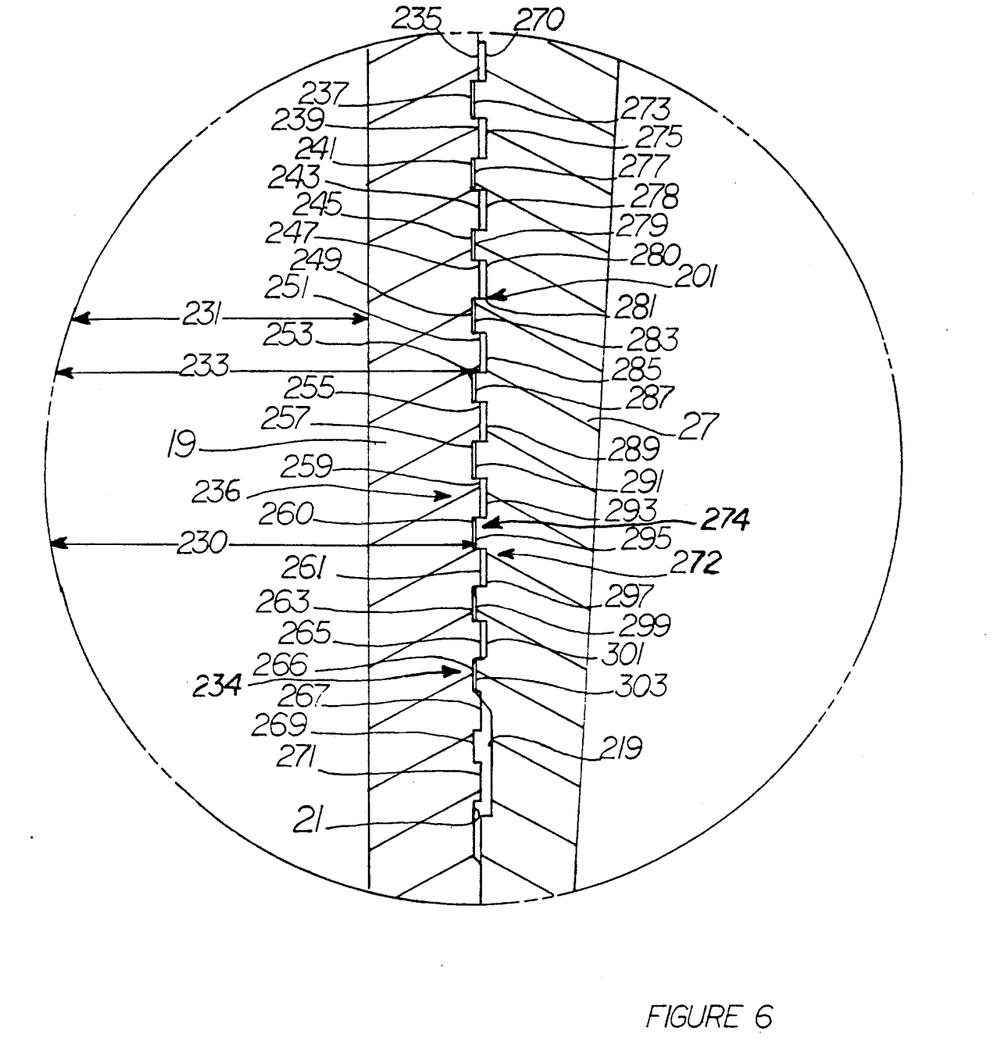
FIG. 6 is a fragmentary longitudinal section view of the groove-and-land coupling between the upper cone ring and the tubular body of the improved liner hanger apparatus of the present invention.

FIG. 6 is fragmentary longitudinal section view of the groove-and-land interference coupling 201 between upper cone ring 27 and exterior surface 21 of tubular member 19. As is shown therein, exterior surface 21 of tubular member 19 includes a plurality of lands 235, 239, 243, 247, 251, 255, 259, 261, 265, 267, 271 and a plurality of groove members 237, 241, 245, 249, 253, 257, 260, 263, 266, and 269. For purposes of clarity and simplicity, hereinafter, groove members shall be designated generally as grooves 234, and the land members shall be designated generally as land members 236. The substantially cylindrical interior surface 219 of upper cone ring 27 likewise includes a plurality of alternating groove members 272 (including groove member 270, 275, 278, 280, 285, 289, 293, 297, and 301) and radial land members 274 (including land members 273, 277, 279, 283, 287, 291, 295, 299, and 303). For purposes of clarity and simplicity, only approximately half of the radial land and groove members of tubular member 19 and upper cone ring 27 are illustrated in FIG. 6.

In the preferred embodiment of the present invention, both tubular member 19 and upper cone ring 27 (as well as lower cone ring 29 and retainer sleeve 165) are formed from 4140 steel, which has a yield strength of 110,000 pounds per square inch, and a modulus of elasticity of 30,000,000 pounds per square inch. Preferably, the nominal inner diameter 231 of tubular member 19 is 4.0 inches. In the preferred embodiment of the present invention, the outer diameter 233 of land members 236 of exterior surface 21 of tubular member 19 in the region of groove and land members 234, 236 is at most 5.0 inches, and at least 4.997 inches. In the preferred embodiment of the present invention, in the region of radial groove and land members 272, 274 of upper cone ring 27, the inner diameter of the land members 274 at room temperature of upper cone ring 27 ranges between a minimum of 4.977 inches and a maximum of 4.980 inches. Therefore the tolerance on the inner diameter 230 of upper cone ring 27 is 0.003 inches. In the preferred embodiment, the minimum height of land members 236 on tubular member 19 is 0.005601251 inches. Also, in the preferred embodiment, the diameter of tubular body 19 at groove members 234 ranges between a minimum of 4.983 inches and a maximum of 4.986 inches. Thus, the tolerance for variance in the diameter of tubular member 19 at groove members 234 is 0.003 inches. As stated above, both tubular member 19 and upper cone ring 27 are formed from 4140 steel, which has an expansion constant of 0.00000633 inches per inch per degree Fahrenheit. Thermal energy is applied to upper cone ring 27, to raise its temperature from ambient temperature to 800 degrees Fahrenheit. This elevation in temperature can be accomplished using a large furnace, or a hand-held blow torch. The steel which forms upper cone ring 27 will expand in response to the elevation in temperature, and will provide a minimum inner diameter for upper cone ring 27 of 5.002 inches, thus providing a clearance of 0.002 inches between the interior surface of upper cone ring 27 and the exterior surface of tubular member 19 at the groove and land coupling. While upper cone ring 27 is maintained at an extremely high temperature, it must be placed concentrically over exterior surface 21 of tubular member 19, and urged into alignment with the groove and land members 234, 236 of exterior surface 21 of tubular member 19. Given the tolerance ranges specified above, it is clear that as upper cone ring 27 cools down to room temperature, it will contract, and cause a inteference fitting between the groove and land members 234, 236, 272, 274.

In the preferred embodiment of the present invention, the groove and land members formed on both exterior surface 21 of tubular member 19 and the interior surface of upper cone ring 27 (and, of course, lower cone ring 29 and retainer sleeve 165) are formed by use of conventional threading equipment. Preferably, six threads per inch are provided on both exterior surface 21 of tubular member 19 and the interior surface of upper cone ring 27, lower cone ring 29, and retainer sleeve 165.

Conventional calculations reveal that the interference coupling between the threaded surfaces on tubular member 19 and upper and lower cone rings 27, 29 and retainer sleeve 165 provide an axial strength per inch of 92,911 pounds of force. It has also been calculated that tubular member 19 and the upper and lower cone ring contact each other at a pressure of 3,024 pounds per square inch. The hoop stress in upper cone ring 27 has been determined to be 40,206 pounds per square inch and the hoop stress in tubular body 19 has been determined to be negative 13,948 pounds per square inch. Thus, it is apparent that use of the interference coupling of the present invention actually enhances the burst strength of tubular body 19. If these components were welded together, it is likely that the metals of these components would degrade as a consequence of the welding.

Viewed broadly, the present invention provides a method of coupling cylindrical-shaped metal components of a tool, which can be accomplished with simple machining (threading operations) of the tool components, which does not require welding of the components, but which does provide a high-force interference coupling.

Once the components are coupled together in an interference fit, it is highly unlikely, if not impossible, for the components to be urged to differing thermal conditions, such as those encountered during make-up, so accidental decoupling becomes highly improbable, if not impossible. If thermal energy is applied to the coupled tool, the materials which form the tool components will expand together, and thus maintain the interference coupling. If the components are cooled, the materials which form the components will contract slightly, but the contraction will be uniform so the coupling will remain intact.

With reference now to FIGS. 1 and 2, the preferred assembly technique of the present invention will be described. A tubular member 19 of appropriate dimensions is provided, and threading equipment is used to provide a selected number of groove-and-land regions on the exterior surface of the tubular member for selective receipt and interference mating with selected ring-shaped components. The components of gripping assembly 17 are provided, and include upper cone ring 27, lower cone ring 29, upper and lower gripping slip arrays 43, 45, guide rails 61, 63, 65, 67, 69, and 71, as well as guide rail retainer ring 111 and connector sleeve 133 with drag springs 147, 149, and 151 disposed thereon. Preferably, guide rail retainer ring 111 and guide rails 61, 63, 65, 67, 69, and 71 are preassembled. Also, preferably, connector sleeve 133 and drag springs 147, 149, and 151 are also preassembled.

During assembly, lower cone ring 29 is heated to approximately eight hundred degrees Fahrenheit, and quickly urged into position upon exterior surface 21 of tubular member 19. Next, the retainer ring sleeve 111 and coupled guide rails 61, 63, 65, 67, 69, and 71 is placed over the lowermost end of tubular member 19 and raised toward lower cone ring 29 with the guide rails urged into approximate guide rail tracks. Thereafter, connector sleeve 133 and drag springs 147, 149, 151 are placed over the lowermost end of tubular member 19 and raised toward retainer ring 111. Connctor sleeve 133 and retainer ring 111 are coupled together.

Then, upper cone ring 27 is likewise heated to approximately eight hundred degrees Fahrenheit, and also quickly urged into position upon exterior surface 21 of tubular member 19. Then, guide rails 61, 63, 65, 67, 69, and 71 are coupled to the gripping slips.

Then, connector sleeve 133, retainer ring 111, and the guide rails and gripping slips are moved axially upward with the gripping slips disposed over the upper and lower cone rings 27, 29 to allow coupling of retainer sleeve 165 to tubular member 19. Retainer sleeve 165 is heated and placed over the lowermost end of tubular member 19 and aligned with the groove and land members before cooling occurs. Finally, j-hooks 141, 143, 145 are secured to pegs 175, 177, and 179.

While the invention has been shown in only one of its forms, it is not thus limited but is susceptible to various changes and modifications without departing from the spirit thereof.

What is claimed is:

1. A method of securing a wellbore tool assembly to a wellbore tubular member, comprising the method steps of:
   providing said wellbore tubular member which defines a surface portion, with a substantially cylindrical shape having a selected tubular diameter;
   providing said wellbore tool assembly which includes a plurality of ring-shaped components, with at least one ring-shaped component defining a cylindrical surface having a selected ring diameter which differs from said tubular diameter of said wellbore tubular member;
   forming a plurality of radial groove members and radial land members on at least one of said cylindrical surface of said wellbore tubular member and said cylindrical surface of said at least one ring-shaped component of said wellbore tool assembly;
   urging said wellbore tubular member and said at least one ring-shaped component to differing thermal conditions to cause said tubular diameter and said ring diameter to change sufficiently to allow the wellbore tubular member and said at least one ring-shaped component to be placed concentrically one within the other without interference between the groove and land members;
   placing said wellbore tubular member and said at least one ring-shaped component in a selected nested position one within the other; and
   urging said wellbore tubular member and said at least one ring-shaped component to substantially similar thermal conditions to cause a radial component to substantially similar thermal conditions to cause a radial interference coupling therebetween.

2. A method according to claim 1, wherein:
   during said step of urging said wellbore tubular member and said at least one ring-shaped component to differing thermal conditions, heat is applied to said at least one ring-shaped component.

3. A method according to claim 1, wherein:
   said wellbore tubular member defines an exterior cylindrical surface and said at least one ring-shaped component of said wellbore tool assembly defines an interior cylindrical surface, with said tubular diameter being larger than said ring diameter; and during said step of urging said wellbore tubular member and said at least one ring-shaped component to differing thermal conditions, heat is applied to said at least one ring-shaped component to expand said ring diameter to allow circumferential placement upon said wellbore tubular member.

4. A method according to claim 1, wherein:

during said step of forming a plurality of radial groove members and radial land members, a plurality of radial groove members and radial land members are formed into said surface portion of said wellbore tubular member and a plurality of radial groove members and radial land members are formed in said cylindrical surface of said at least one ring-shaped component; and during said step of urging said wellbore tubular member and said at least one ring-shaped component to differing thermal conditions, said groove and land members on said at least one ring-shaped component are temporarily altered in dimension to allow make-up with said groove and land members on said wellbore tubular member.

5. A method of securing a wellbore tool assembly to a wellbore tubular member, comprising the method steps of:

providing said wellbore tubular member which includes an exterior surface with a surface portion which defines a substantially cylindrical shape having a selected maximum tubular diameter;

providing said wellbore tool assembly which includes at least one ring-shaped component with an interior surface which defines a cylindrical surface having a selected minimum ring diameter which is smaller than said maximum tubular diameter of said wellbore tubular member;

forming a plurality of radial groove members and radial land members on at least one of said exterior surface of said wellbore tubular member and said interior surface of said at least one ring-shaped component of said wellbore tool assembly;

placing portions of said wellbore tool assembly circumferentially about a portion of said exterior surface of said wellbore tubular member;

applying heat to said at least one ring-shaped component to cause thermal expansion of said at least one ring-shaped component to expand said minimum ring diameter to a dimension larger than said maximum tubular diameter of said wellbore tubular member;

while maintaining said at least one ring-shaped component in an expanded condition, placing said at least one ring-shaped component of said wellbore tool assembly in a selected position upon said exterior surface of said wellbore tubular member;

cooling said at least one ring-shaped component of said wellbore tool assembly to cause shrinkage of said at least one ring-shaped component and nearly return to said minimum ring diameter, causing an interference coupling between said wellbore tubular member and said at least one ring-shaped component of said wellbore tool assembly;

maintaining said wellbore tubular member and said ring-shaped component of said wellbore tool assembly at substantially similar thermal conditions to maintain said interference coupling; and at least partially retaining said wellbore tool assembly in a substantially fixed position upon said exterior surface of said wellbore tubular member with said at least one ring-shaped component.

6. A method according to claim 5, wherein:

during said step of retaining said wellbore tool assembly, said wellbore tool assembly is retained in a substantially fixed position upon said exterior surface of said wellbore tubular member substantially entirely by said at least one ring-shaped component, without requiring weldment between said wellbore tubular member and said wellbore tool assembly.

7. A method according to claim 5, wherein:

said wellbore tool assembly includes components which cooperate to at least partially transfer an axial load to a concentrically nested tubular within a wellbore, said method further comprising:

transferring at least a portion of an axial load applied to said wellbore tubular member through said at least one ring-shaped component to said concentrically nested tubular.

8. A method of securing a wellbore tool assembly to a wellbore tubular member, comprising the method steps of:

providing said wellbore tubular member which includes an exterior surface with a surface portion which defines a substantially cylindrical shape having a selected maximum tubular diameter;

providing said wellbore tool assembly which includes at least one ring-shaped component with an interior surface which defines a cylindrical surface having a selected minimum ring diameter which is smaller than said maximum tubular diameter of said wellbore tubular member;

forming a plurality of radial groove members and radial land members on a portion of said exterior surface of said wellbore tubular member;

forming a plurality of radial groove members and radial land members on a portion of said interior surface of said at least one ring-shaped component of said wellbore tool assembly, with selected ones of said radial land members oversized with respect to corresponding groove members on said exterior surface of said wellbore tubular member;

placing portions of said wellbore tool assembly circumferentially about a portion of said exterior surface of said wellbore tubular member;

applying heat to said at least one ring-shaped component to cause thermal expansion of said at least one ring-shaped component to expand said minimum ring diameter to a dimension larger than said maximum tubular diameter of said wellbore tubular member;

while maintaining said at least one ring-shaped component in an expanded condition, placing said at least one ring-shaped component of said wellbore tool assembly in a selected position upon said exterior surface of said wellbore tubular cooling said at least one ring-shaped component of said wellbore tool assembly to cause shrinkage of said at least one ring-shaped component and nearly return to said minimum ring diameter, causing an interference coupling between said wellbore tubular member and said at least one ring-shaped component of said wellbore tool assembly;

maintaining said wellbore tubular member and said ring-shaped component of said wellbore tool assembly at substantially similar thermal conditions to maintain said interference coupling; and at least partially retaining said wellbore tool assembly in a substantially fixed position upon said exterior surface of said wellbore tubular member with said at least one ring-shaped component.

9. A method according to claim 8, wherein:

an interference coupling is provided between selected ones of said radial groove and land members.

10. A method according to claim 8, wherein:

during said step of retaining said wellbore tool assembly, said wellbore tool assembly is retained in a substantially fixed position upon said exterior surface of said wellbore tubular member substantially entirely by said at least one ring-shaped component, without requiring weldment between said wellbore tubular member and said wellbore tool assembly.

11. A method according to claim 8, wherein:

said wellbore tool assembly includes components which cooperate to at least partially transfer an axial load to a concentrically nested tubular within a wellbore, said method further comprising:

transfering at least a portion of an axial load applied to said wellbore tubular member through said at least one ring-shaped component to said concentrically nested tubular.

12. A method of securing a wellbore tool assembly to a wellbore tubular member, comprising the method steps of:

providing said wellbore tubular member which includes an exterior surface with a surface portion which defines a substantially cylindrical shape having a selected maximum tubular diameter;

providing said wellbore tool assembly which includes upper and lower ring-shaped components, each with an interior surface which defines a cylindrical surface having a selected minimum ring diameter which is smaller than said maximum tubular diameter of said wellbore tubular member;

forming a plurality of radial groove members and radial land members on said exterior surface of said wellbore tubular member, defining upper and lower groove-and-land regions spaced apart a selected distance along said exterior surface of said wellbore tubular member;

forming a plurality of radial groove members and radial land members on said interior surfaces of said upper and lower ring-shaped components of said wellbore tool assembly, with selected ones of said radial land members oversized with respect to corresponding groove members on said exterior surface of said wellbore tubular member;

placing portions of said wellbore tool assembly circumferentially about said exterior surface of said wellbore tubular member between said upper and lower groove-and-land regions;

applying thermal energy to said upper and lower ring-shaped components to cause thermal expansion of said upper and lower ring-shaped components to a dimension larger than said maximum tubular diameter of said wellbore tubular member;

while maintaining said upper and lower ring-shaped components in an expanded condition, placing said upper and lower ring-shaped components of said wellbore tool assembly upon said upper and lower groove-and-land regions of said exterior surface of said wellbore tubular member;

cooling said upper and lower ring-shaped components of said wellbore tool assembly to cause shrinkage and nearly return to said minimum ring diameter, causing an interference coupling between said wellbore tubular member and said upper and lower ring-shaped components of said wellbore tool assembly;

maintaining said wellbore tubular member and said upper and lower ring-shaped components of said wellbore tool assembly at substantially similar thermal conditions to maintain said interference coupling; and at least partially retaining said wellbore tool assembly in a substantially fixed position upon said exterior surface of said wellbore tubular member with said upper and lower ring-shaped components.

13. A method according to claim 12, wherein:

an interference coupling is provided between selected ones of said radial groove and land members of said upper and lower ring-shaped components and said upper and lower groove-and-land regions of said wellbore tubular member.

14. A method according to claim 12, wherein:

during said step of retaining said wellbore tool assembly, said wellbore tool assembly is retained in a substantially fixed position upon said exterior surface of said wellbore tubular member substantially entirely by said upper and lower ring-shaped components, without requiring weldment between said wellbore tubular member and said wellbore tool assembly.

15. A method according to claim 12, wherein:

said wellbore tool assembly includes components which cooperate to at least partially transfer an axial load to a concentrically nested tubular within a wellbore, said method further comprising:

transferring at least a portion of an axial load applied to said wellbore tubular member through at least one of said upper and lower ring-shaped components to said concentrically nested tubular.

16. A method of manufacturing a liner hanger apparatus, comprising:

providing a tubular body, with a generally cylindrical exterior surface defining a selected maximum outer diameter for said tubular body;

providing a gripping assembly which includes at least one cone ring, at least one gripping slip, and a guide assembly for retaining said at least one gripping slip in a selected radial position relative to said tubular body and said at least one cone ring, with at least one component of said gripping assembly being a ring-shaped component with an interior surface defining a selected minimum inner diameter for said at least one ring-shaped component which is smaller than said selected outer diameter of said tubular body;

placing portions of said gripping assembly upon said generally cylindrical exterior surface of said tubular body;

urging said tubular body and said at least one ring-shaped component of said gripping assembly to differing thermal conditions to expand said minimum inner diameter to a dimension larger than said selected maximum outer diameter;

placing said ring-shaped component in a selected location on said generally cylindrical exterior surface of said tubular body;

returning said tubular body and said ring-shaped component of said gripping assembly to substantially similar thermal conditions;

maintaining said tubular body and said ring-shaped component of said gripping assembly in substantially similar thermal conditions to prevent relative displacement of said ring-shaped component and said tubular body; and securing, with at least said ring-shaped component, said gripping assembly in a selected location on said generally cylindrical exterior surface of said tubular body.

17. A method of manufacturing a liner hanger, comprising:

providing a tubular body, with a generally cylindrical exterior surface defining a selected maximum outer diameter for said tubular member;

providing a gripping assembly which includes at least one cone ring, at least one gripping slip, and a guide assembly for retaining said at least one gripping slip in a selected radial position relative to said tubular body while allowing relative axial movement between said tubular body and said at least one gripping slip, with at least one component of said gripping assembly being a ring-shaped component with an interior surface defining a selected minimum inner diameter for said at least one ring-shaped component which is smaller than said selected outer diameter of said tubular body;

providing a plurality of radial groove-and-land members on at least one of said generally cylindrical exterior surface of said tubular body and said interior surface of said ring-shaped component;

placing portions of said gripping assembly upon said generally cylindrical exterior surface of said tubular body;

urging said tubular body and said at least one ring-shaped component of said gripping assembly to differing thermal conditions to expand said minimum inner diameter to a dimension larger than said selected maximum outer diameter;

placing said ring-shaped component in a selected location on said generally cylindrical exterior surface of said tubular body;

returning said tubular body and said ring-shaped component of said gripping assembly to substantially similar thermal conditions;

maintaining said tubular body and said ring-shaped component of said gripping assembly in substantially similar thermal conditions to prevent relative displacement of said ring-shaped component and said tubular body; and securing, with at least said at least one ring-shaped component, said gripping assembly in a selected location on said generally cylindrical exterior surface of said tubular body.

18. A method of manufacturing a liner hanger apparatus, comprising the steps of:

providing a tubular body with a generally cylindrical exterior surface;

forming radial groove members and radial land members on a portion of said generally cylindrical exterior surface of said tubular body which define root and crest portions;

providing a metal cone ring with a tapered exterior surface and a generally cylindrical interior surface;

forming radial groove members and radial land members on said generally cylindrical interior surface of said cone ring, which define root and crest portions, with a plurality of crest portions which are larger than corresponding root portions on said exterior surface of said tubular body;

heating said metal cone ring to expand said metal from which said metal cone ring is formed, causing said metal cone ring to enlarge by thermal expansion to a size which allows placement about said generally cylindrical exterior surface of said tubular body by a substantially axial movement between said metal cone ring and said tubular body without interference between the grooves and land members of said tubular body and the grooves and land members of said metal cone ring;

placing said cone ring in a selected location on said tubular body;

cooling said metal cone ring to allow said groove members and said land members of said metal cone ring to return to a pre-expansion condition, causing an interference fit between a plurality of said root and crest portions on said generally cylindrical exterior surface of said tubular body and said root and crest portions on said generally cylindrical interior surface of said metal cone ring;

providing a gripping slip assembly; and placing said gripping slip assembly into position relative to said tubular body and said metal cone ring.

19. A method of manufacturing a liner hanger apparatus, comprising the steps of:

providing a tubular body with a generally cylindrical exterior surface;

forming threads on a portion of said generally cylindrical exterior surface of said tubular body which are defined by root and crest portions;

providing a metal cone ring with a tapered exterior surface and a generally cylindrical interior surface;

forming threads on said generally cylindrical interior surface of said cone ring, which are defined by root and crest portions, with a plurality of crest portions which are larger than corresponding root portions of said threads on said exterior surface of said tubular body;

heating said metal cone ring to expand said metal from which said cone ring is formed, causing said root portions of said threads on said generally cylindrical interior surface of said cone ring to enlarge by thermal expansion to a size which allows placement of said metal cone ring on said generally cylindrical exterior surface of said tubular body by a substantially axial movement between said metal cone ring and said tubular body without interference between the grooves and land members of said tubular body and the grooves and land members of said metal cone ring;

placing said metal cone ring on said tubular member before said metal cone ring cools;

cooling said metal cone ring to allow said threads of said metal cone ring to return to a pre-expansion condition, causing an interference fit between a plurality of root and crest portions of said threads on said generally cylindrical exterior surface of said tubular body and said generally cylindrical interior surface of said metal cone ring;

providing a gripping slip assembly; and placing said gripping slip assembly into position relative to said tubular body and said metal cone ring.

20. The method of manufacturing a liner hanger apparatus according to claim 19, further comprising:

securing said gripping slip in position relative to said tubular body.

21. The method of manufacturing a liner hanger apparatus according to claim 19, further comprising:
    forming additional threads on a portion of said generally cylindrical exterior surface of said tubular body which are defined by root and crest portions;
    providing a metal retainer ring having a generally cylindrical interior surface;
    forming threads on said generally cylindrical interior surface of said retainer ring, which are defined by root and crest portions, with a plurality of crest portions which are larger than corresponding root portions of said threads on said generally cylindrical exterior surface of said tubular body;
    heating said metal retainer ring to expand said metal from which said metal retainer ring is formed, causing said generally cylindrical interior surface to enlarge by thermal expansion to a size which allows placement of said metal retainer ring on said generally cylindrical exterior surface of said tubular member by a substantially axial movement between said metal retainer ring and said tubular member without interference between the grooves and land members of said tubular member and the grooves and land members of said metal retainer ring;
    placing said metal retainer ring in a selected location on said tubular body before said metal retainer ring cools;
    cooling said metal retainer ring to allow said threads of said metal retainer ring to return to a pre-expansion condition, causing an interference fit between a plurality of root and crest portions of said threads on said generally cylindrical exterior surface of said tubular body and said generally cylindrical interior surface of said metal retainer ring; and
    wherein said gripping slip assembly is secured in position upon said tubular body between said metal cone ring and said metal retainer ring, without weldment.

* * * * *